US007800979B2

(12) United States Patent
Hu et al.

(10) Patent No.: US 7,800,979 B2
(45) Date of Patent: Sep. 21, 2010

(54) BEAMFORMING METHOD AND APPARATUS USED IN ULTRASONIC IMAGING SYSTEM

(75) Inventors: Qinjun Hu, Shenzhen (CN); Xiaogang Kang, Shenzhen (CN); Yong Jiang, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 963 days.

(21) Appl. No.: 11/607,573

(22) Filed: Dec. 1, 2006

(65) Prior Publication Data

US 2008/0033299 A1 Feb. 7, 2008

(30) Foreign Application Priority Data

Aug. 2, 2006 (CN) ........................ 2006 1 0061969

(51) Int. Cl.
*H04B 1/02* (2006.01)

(52) U.S. Cl. ........................................ 367/138; 367/11

(58) Field of Classification Search .................. 367/11, 367/138; 600/447; 73/626
See application file for complete search history.

(56) References Cited

U.S. PATENT DOCUMENTS 6,123,671 A 9/2000 Miller
6,252,975 B1 6/2001 Bozdagi et al.
2008/0033299 A1* 2/2008 Hu et al. ..................... 367/138
2009/0054780 A1* 2/2009 Yang et al. .................. 367/105

FOREIGN PATENT DOCUMENTS

CN 1540363 A 10/2004
WO 2004112240 A1 12/2004

OTHER PUBLICATIONS

Ma, Jia-chen et al., "Research Evolution of Ultrasound Beamforming Technology," Chinese Journal of Medical Instrumentation, Jun. 29, 2005, pp. 443-445, p. 438.

* cited by examiner

*Primary Examiner*—Dan Pihulic
(74) *Attorney, Agent, or Firm*—Kory D. Christensen; Stoel Rives LLP

(57) ABSTRACT

The present invention relates to a beamforming method used in an ultrasonic imaging system, the method comprises: receiving the reflected echo signal from the reception my by the transducer elements of the probe; transmit the received reflected echo signal by the transducer element to a receiving and processing channel to be amplified and AD converted to obtain digital echo data; storing the digital echo data into the memory; generating apodization parameters by the apodization parameter real time calculation device based on the digital echo data; and performing beamforming by the receiving and beamforming module by involving the generated apodization parameters. Memory resources of the system can be saved by the technical solution of the present invention, and the speed of parameter loading can be increased when the probe is switched by the system.

9 Claims, 4 Drawing Sheets

BEAMFORMING METHOD AND APPARATUS USED IN ULTRASONIC IMAGING SYSTEM

FIELD OF THE INVENTION

The present invention relates to a beamforming method and apparatus used in ultrasonic imaging system, and in particular, relates to a method and apparatus for real-time calculating beamforming apodization parameters during the reception process, which is intended to save the system memory resource.

BACKGROUND OF THE INVENTION

In an ultrasonic imaging apparatus, an apodization parameter is necessary to beamforming. For the majority of ultrasonic imaging systems, the apodization parameter is calculated in advance and stored in hardware storage. Since the apodization parameter is a quantity varying with the depth variation of the received beam, and is further relevant to the position of the reception ray in linear array trapezoid scanning and phase-controlled matrix scan. Therefore the total number of those apodization parameters may be up to tens of Mbits or more. Thus this will cause the increasing of extra memory devices of the system, as well as the cost thereof. Furthermore, the time needed to load new parameters when a probe is switched will also be relatively longer, and thus causing the use of the apparatus to be inconvenient.

The U.S. Pat. No. 6,123,671 discloses a method for reading corresponding apodization values from pre-stored apodization parameters by different transducer elements, but does not relate to real time calculation of apodization parameters. The solution of U.S. Pat. No. 6,123,671 still needs relatively large amount of memory space because stored apodization parameters are relevant to the depths, and is suitable for perpendicular transmitting of convex matrix and linear matrix, therefore is relatively restricted.

The real time parameter calculation with hardware is a possible solution. A scanning line is taken as a basic unit of ultrasonic imaging. Only a few number of parameters are required to be pre-stored, and only several control parameters are required to be written before the transmitting/receiving of each scanning line, required apodization parameters can be automatically generated by the hardware during the reception, thereby the memory resources of the system can be greatly saved.

SUMMARY OF THE INVENTION

The technical problem to be solved by the present invention is to provide a beamforming method and apparatus to be used in ultrasonic imaging systems.

The present invention provides a beamforming method used in an ultrasonic imaging system comprising:

receiving reflected echo signals from reception rays by transducer elements;

transmitting, by the transducer elements, the received reflected echo signals to a receiving and processing channel for amplification processing and AD conversion to obtain digital echo data;

storing said digital echo data in a memory;

generating, by an apodization parameter real time calculation device, apodization parameters based on said digital echo data; and forming a beam by invoking the generated apodization parameters.

The present invention further provides a beamforming apparatus used in an ultrasonic imaging system, comprising:

a probe including a plurality of transducer elements, for receiving reflected echo signals from reception rays;

receiving and processing channels, for amplifying, processing and A/D converting the received reflected echo signals to obtain digital echo data;

a memory, for storing said digital echo data;

an apodization parameter real time calculation device, for generating apodization parameters based on said digital echo data; and a beamforming module, for forming a beam by invoking the generated apodization parameters.

The present invention further provides a real time calculation apparatus for calculating apodization parameters, said apodization parameters are used for fixing a beam in an ultrasonic imaging system, said calculation apparatus is connected to a signal input terminal of a receiving and beamforming module of the ultrasonic imaging system, said calculation apparatus comprises:

first to third multipliers,
first to fourth adders,
a subtractor,
a divider,
a sampling rate memory,
a reception aperture memory,
a sampling starting point memory,
an apodization curve memory,
an apodization depth counter,
a channel counter,
a coefficient selector,
a data selection module,
an address processing module, and
a timing control module;

wherein, signal output terminals of said timing control module are connected to said channel counter and said apodization depth counter, respectively; said apodization depth counter sends its count value to the sampling rate memory, the reception aperture memory, and the sampling staring point memory, respectively; input terminals of said first multiplier are connected to an input of a second aperture deflection parameter ΔFx/d and said varying depth counter, and the output thereof is sent to said first adder together with a first aperture deflection parameter Fx0/d;

input terminals of said second multiplier are connected to output terminals of the first adder and the sampling rate memory, respectively; the output terminal of said second multiplier is connected to the coefficient selector; an input terminal of said divider is connected to the reception aperture memory, an output terminal of said divider are connected to said second adder; said subtractor subtracts ChanNum/2 from the count value of said channel counter, and the output thereof is sent to said second adder; wherein the ChanNum is the number of channels;

input terminals of said third multiplier are connected to the output terminals of the second adder and the sampling rate memory, respectively; an output terminal of said third multiplier and an output terminal of the coefficient selector are connected to the third adder; an output of said third adder and an output of the sampling point memory are added by the fourth adder and their sum is sent to said address processing module for address processing; an address outputted by the address processing module is used as a read address of said apodization curve memory, the data read therefrom is sent to said data selection module; and said data selection module outputs an apodization value of channel n at apodization depth j.

As compared with the prior art, the beamforming method and apparatus of the present invention are of the following advantages: under the premise of the guarantee of the quality of forming a beam, the number of parameters required to be stored by the system is fewer, thus the memory resources of the system can be saved; and the speed that the system loads the parameters during switch of the probe is also faster.

DETAILED DESCRIPTION OF THE PREFERRED EMBODIMENTS

Figure 1:
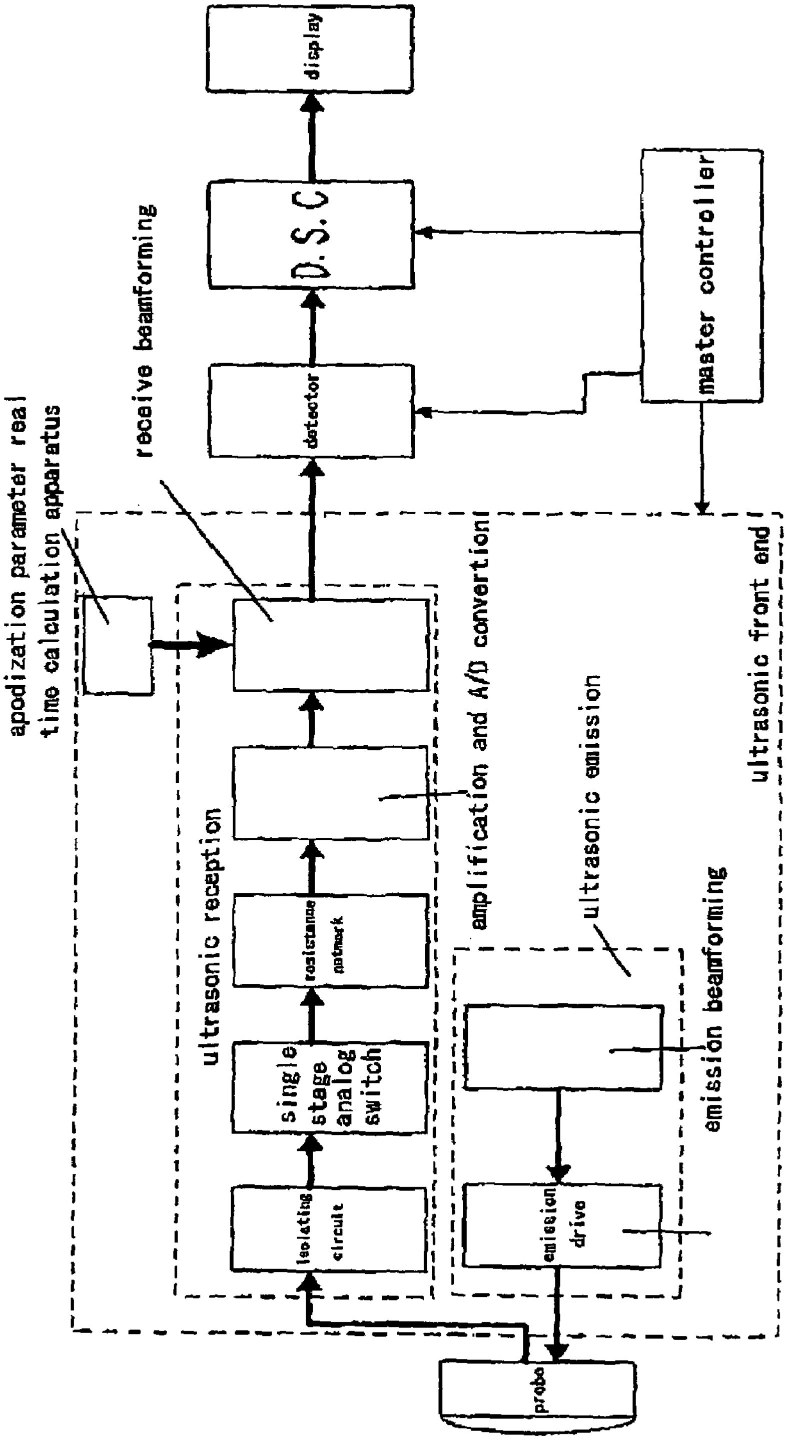
FIG. 1 is a schematic block diagram of an ultrasonic imaging system incorporating the apparatus of the present invention.

The following is a detailed description of the method and apparatus of the present invention with reference to the drawings and embodiments.

In one embodiment of the present invention, a beamforming method to be used in an ultrasonic imaging system is provided, and comprises the following steps:

a. each of transducer elements of the probe receives reflected echo signal from the received rays;

b. the each of the transducer elements of the probe sends the received reflected echo signal into respective signal receiving and processing channel to perform amplification processing and A/D conversion;

c. the digital echo data in each channel after A/D conversion are sent into a FIFO memory, respectively;

d. an apodization parameter real time calculation apparatus calculates and generates, in real-time, apodization parameters of the digital echo signal in the FIFO memory; and e. a receiving and beamforming module performs beamforming by invoking the apodization parameters generated by the apodization parameter real time calculation apparatus.

The transducer elements, for example, are piezoelectric ceramics tablets regularly arranged within the probe.

The real time calculation of the apodization parameters in the above-mentioned step d comprises the steps of:

a. presenting a function of length N in the system, e.g., a Gauss window or limiting window, as an apodization reference curve; and b. sampling the preset apodization reference curve at different starting point and different sampling rate according to depth, based on the preset parameters, taking results of the sampling as the apodization curve at different depths of the respective signal receiving and processing channels.

In exploitation of the symmetric characteristic of the apodization reference curve, only the N/2 points of the left half or the right half of the curve is saved in the system. In order to guarantee the necessary calculation precision, N is greater than 32, a typical value of N is 1024.

When apodization parameters at different depths are sampled by the use of the apodization reference cue, it is determined first whether a corresponding transducer element is within the aperture, the apodization parameter outside the aperture is 0, the transducer elements within the aperture are sampled from start $P_j$, the sampling rate is $\Delta n_j$, where j represents a different reception depth, and the apodization parameter $Rapo_{j,n}$ within the aperture is calculated using the following formula:

$$Rapo_{j,n} = \begin{cases} \mathrm{Win}(P_{j,n}) & n \text{ within the aperture} \\ 0 & n \text{ outside the aperture} \end{cases}$$

where $$P_{j,n} = StartP_j + (n - ChanNum/2 + Aper_j/2) * \Delta n_j + Offset_j$$

$$\text{if } (P_{j,n} > N/2 - 1)\ P_{j,n} = N - 1 - P_{j,n}$$

$$Offset_j = -Fx_j/d * \Delta n_j$$

$d$ is a interval between transducer elements $$Fx_j = Fx_{j-1} + \Delta Fx = Fx_0 + j * \Delta Fx$$

In the above formula, $\mathrm{Win}(P_{j,n})$ are functions having a normal distribution, $Aper_j$ are sizes of the reception apertures $Starp_j$ is the value of the starting point sampled on the apodization curve within the aperture at different apodization depth, ΔFx refers to the interval in between abscissas of the reception focuses in the case of two apodization curves changing, j is the depth, and n is a serial number of a transducer element, for a system with ChanNum reception channels, n ranges from 0 to ChanNum-1.

The hardware implementation of the above-mentioned real time calculation method comprises following processes:

Storing respective relevant parameters, in advance, into respective memories, i.e., storing the sampling rate $\Delta n_j$ of the apodization curve into the sampling rate memory, storing the reception aperture $Aper_j$ into the reception aperture memory, storing the starting point value $starP_j$ the sampling starting point memory, storing the left half of the normalized apodization reference curve into the apodization curve memory; then the real time calculation of the reception apodization parameter comprises follow steps:

i. under the control of the timing control module, the apodization depth counter counts by increasing 1 according to the time interval of the apodization variation;

ii. the apodization depth counter assigns its count values to the sampling rate memory, the reception aperture memory and the sampling starting point memory, respectively, as their read address, and reads the sampling rate parameter $\Delta n_j$ at the apodization depth from the sampling rate memory, the reception aperture parameter $Aper_j$ at the apodization depth from the reception aperture memory, and the sampling starting point parameter $startP_j$ at the apodization depth from the sampling starting point memory, respectively;

iii. the second aperture deflection parameter ΔFx/d is multiplied by the apodization depth count value in the first multiplier, the obtained product is further added to the first aperture deflection parameter Fx0/d in the first adder to obtain a factor $Fx_j/d$ at the apodization dept, then the factor is multiplied by the sampling rate parameter $\Delta n_j$ in the second multiplier, their product is the offset $Offset_j$ in this mode;

iv. if the channel corresponding to the count value of the channel counter is within the reception aperture $Aper_j$, then the coefficient selection signal selects the second multiplier to calculate and output the offset; if the channel corresponding to the count value of the channel counter is outside the reception aperture $Aper_j$, then the coefficient selection signal selects the second multiplier to calculate and output 0, this selection control is implemented at the coefficient selector;

v. the reception aperture value at the depth is divided by 2 after it is read out from the reception aperture memory, the result of the division is added to the difference value of the count value of the channel counter minus ChanNum/2 at the second adder, the result of the addition is multiplied by the sampling rate $\Delta n_j$ at the third multiplier, and their product is the factor $(n\text{-ChanNum}/2+Aper_j)*\Delta n_j$;

vi. the offset $Offset_j$, sampling stag point parameter $StartP_j$, and factor $(n\text{-ChanNum}/2+Aper_j)*\Delta n_j$ are added at the third adder and the fourth adder to obtain the sampling coordinates of the channel n at the apodization depth j, the sampling coordinates correspond to the factor $P_{j,n}$, and are address-processed in the address processing module; if the sampling coordinates are greater than half of the length of the apodization curve (i.e., N/2), then the address is set to be $N-1-P_{j,n}$; if the sampling coordinate axe less than or equal to half of the length of the apodization curve, then the address is set to be $P_{j,n}$;

vii. the address outputted from the address processing module is taken as the read address of the apodization curve memory, the data read out are sent to a data selection module; if the channel is within the reception aperture, the data selection signal selects the data outputted from the memory, the data read out from this address is the apodization parameter of channel n at the apodization depth j; if this channel is outside the reception aperture, the data selection signal selects data 0, then the apodization parameter of this channel n at the apodization depth j is zero;

viii. when the apodization depth is j, the timing control module controls the channel counter to count up from channel 0 to channel ChanNum-1 with time interval of 1;

the steps i to viii are performed cyclically to achieve the real the calculation of the apodization parameters of ChanNum channels.

The reception channel number ChanNum ranges from 1 to 512, and the typical value thereof is 32, 64 or 128.

FIG. 1 is a schematic block diagram showing a B-type ultrasonic imaging system. In FIG. 1, the real time calculation apparatus of the reception apodization parameter of the present invention, as an independent attachment, is connected to signal input terminals of the reception beamforming module of the ultrasonic imaging system.

The following is the description of a B-type ultrasonic imaging system of 64 channels and single beam as an example. Obviously, it is very easy to extend the technical solution of the present invention to the situations of other numbers of channels (e.g., 24, 48 or more channels) and multiple beams.

I. The principle of beamforming can be expressed by the following formula:

$$BFecho(j) = \sum_{i=1}^{n} [rapo(i)(j)*A(j)*Gecho(i)(j) + rapo(i)(j)*B(j)*Gecho(i)(j+1)] \quad (1)$$

Where, BFecho(j) is a resultant of beamforming; j is time; i is a number of a reception channel; n is a reception aperture; Gecho is an echo signal of each of the channels adjusted with coarse delay; A and B are interpolation coefficients; and rapo is the apodization parameter, its function is to give different weighs to echoes of different channels, as seen in the formula (1). Normally, the apodization parameters of the channels are different from each other, and vary with the depths.

In a practical system configuration, although apodization curves (i.e., curves constituted by the apodization values of different channels) at different depths are different from one another, however, they can be regarded as one segment or the whole of the same curve (in most cases, Gauss window or Hamming window) after being pulled or compressed. Based on this fact, the present invention proposed a method for obtaining apodization curves at different depths based on different samplings of the same preset curve.

Figure 2:
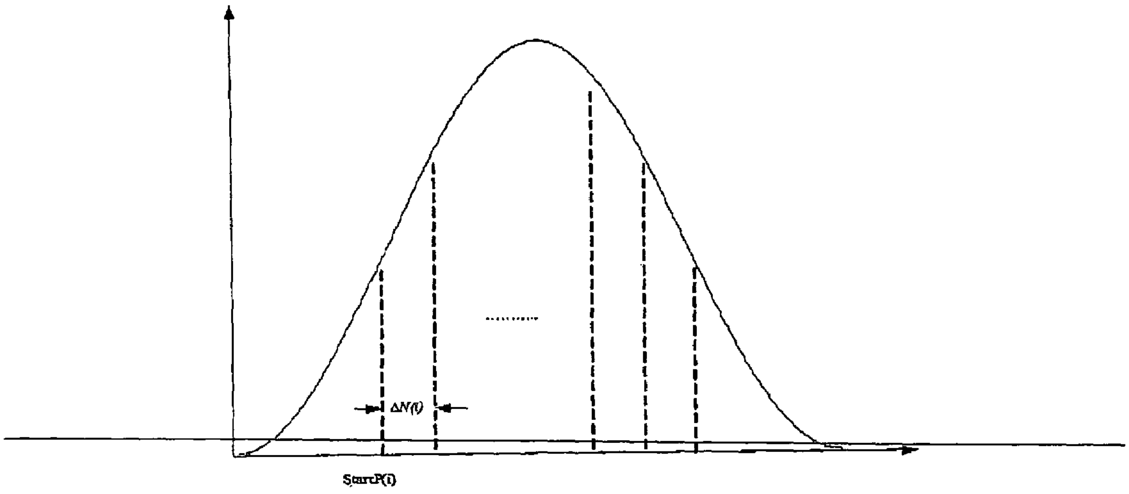
FIG. 2 is a graph showing an apodization reference graph employed in an embodiment of the present invention.

An apodization parameter is obtained by sampling an apodization curve of pre-stored coefficients (referring to FIG. 2). The length of the pre-stored apodization curve is N. In common case, the curve is symmetrical, so only N/2 points therein are saved (e.g., the left half of the curve shown in FIG. 2) with 8 bits per point. If the hardware memory space is sufficient, preferably N is a big value. In one embodiment of the present invention, the value of N takes 1024 points.

When the apodization parameters are sampled from the apodization curve by hardware, it is determined first whether the corresponding transducer element is within the aperture, apodization parameters of the transducer element outside the aperture are zeros; the transducer elements within the apelike are sampled starting from $StartP_j$, and the sampling rate is $\Delta n_j$, where j denotes different reception depths. $StartP_j$, and $\Delta n_j$ are calculated by software and stored in RAM in advance. It is assumed that the apodization parameter is defined as $Rapo_{j,n}$ where j is depth and n is a serial number of the transducer element (for a system with ChanNum reception channels, n ranges from 0 to ChanNum-1). The calculation of $Rapo_{j,n}$ is as follows:

$$Rapo_{j,n} = \begin{cases} \text{Win}(P_{j,n}) & n \text{ is within the reception aperture} \\ 0 & n \text{ is outside the reception aperture} \end{cases} \quad (2)$$

where $P_{j,n} = StartP_j + (n - ChanNum/2 + Aper_j/2)*\Delta n_j$ if $(P_{j,n} > N/2-1)$ $P_{j,n} = N-1-P_{j,n}$ Where, $P_{j,n} = StartP_j + (n - ChanNum/2 + Aper_j/2)*\Delta n_j$ If $(P_{j,n} > N/2-1)$; $P_{j,n} = N-1-P_{j,n}$ $\text{Win}(P_{j,n})$ in the above formula is a pre-stored apodization curve, and $Aper_j$ represents the reception aperture at depth j: While setting the parameters, it is guaranteed by $Aper_j$, $startP_j$ and $\Delta n_j$ that a central point of the apodization curve sampled according to formula (2) is always maximum, and the curve is substantially symmetrical.

Figure 3:
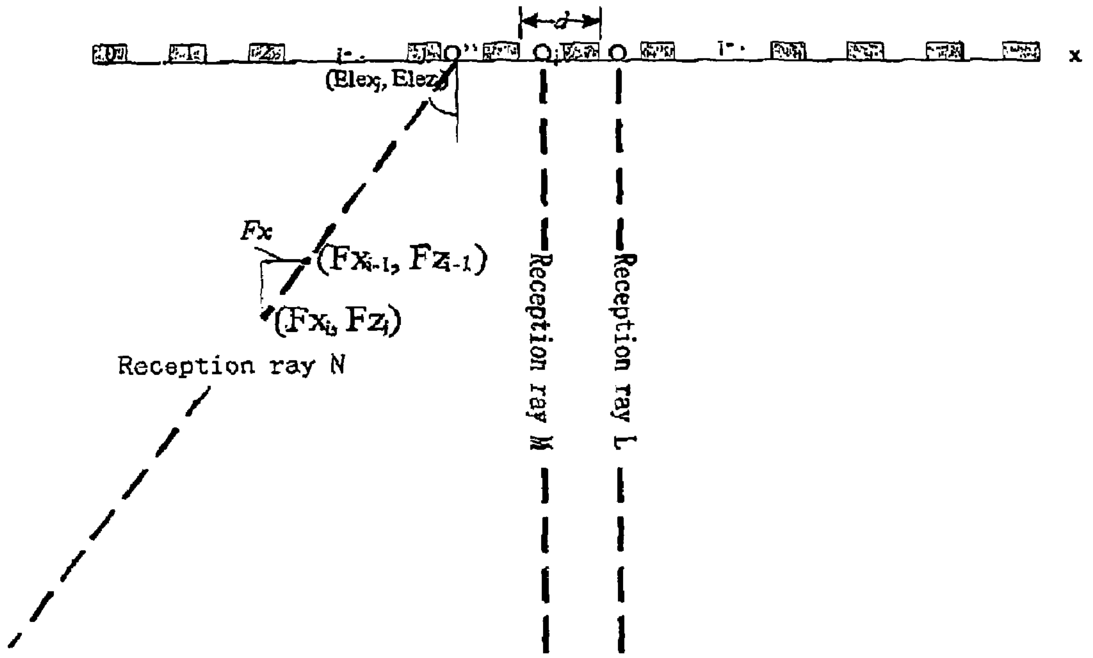
FIG. 3 is a schematic diagram showing the acquisition scheme of the reception apodization parameter by the ultrasonic imaging system in accordance with an embodiment of the present invention.

Formula (2) is suitable for the cases of perpendicular emission and reception of convex matrix and linear matrix, and requires that a stating point of reception ray is located at the centre of the reception aperture. As shown in FIG. 3, L is the reception ray and O is the center of aperture, wherein the starting point of the reception ray L coincides with the center O.

II. Taking the Aperture Offset into Consideration

Practically, the reception ray is usually not located on the center of the reception aperture, or, the aperture offsets (the reception ray M shown in FIG. 3, O is the center of aperture, and O' is the staring point of the reception ray M). In such case, the formula (2) can not be used directly for calculating the apodization of the reception ray M.

The reception ray M differs from the reception ray L mainly in that their transducer elements closest to the reception ray M are different. Generally, it is expected that the transducer element closest to the reception focus is of the maximum apodization, this can be achieved-only by changing the calculation of $P_{j,n}$ in formula (1) in the following way:

$$Rapo_{j,n} = \begin{cases} \text{Win}(P_{j,n}) & n \text{ is within the reception aperture} \\ 0 & n \text{ is outside the reception aperture} \end{cases} \quad (2)$$

where $$P_{j,n} = StartP_j + (n - ChanNum/2 + Aper_j/2) * \Delta n_j + Offset_j$$

$$\text{if } (P_{j,n} > N/2 - 1)\ P_{j,n} = N - 1 - P_{j,n}$$

$$Offset_j = O'O/d * \Delta n_j$$

$d$ is interval between transducer elements.

With respect to formula (2), an offset $Offset_j$ is added in the calculation of $P_{j,n}$ in formula (2'). This offset is dependent on the depth. In an implementation, the value of O'O/d may be calculated in advance by software, and written into the hardware before the start of scanning, then the $Offset_j$ is calculated in real time. Formula (2') is suitable for perpendicular scanning of convex matrix and linear matrix.

III. Deflecting Reception

For the trapezoidal scanning of phased matrix and linear matrix, the reception scanning ray is not perpendicular to the surface of the probe, (in FIG. 3, N is the reception ray, O is the center of the aperture, O" is the starting point of the reception ray N, and α is the deflection angle of the reception ray N). Since the reception ray is deflected at a deflection angle, therefore, for each of the reception focuses, the transducer elements of the probe closest to it are different. Therefore, the formula (2') is not suitable for the reception ray N. For the reception focus with its reception focus coordinates located at ($Fx_j$, $Fz_j$), the calculation of the apodization curve $Rapo_{j,n}$ is as follows;

$$Rapo_{j,n} = \begin{cases} \text{Win}(P_{j,n}) & n \text{ is within the reception aperture} \\ 0 & n \text{ is outside the reception aperture} \end{cases} \quad (3)$$

where $$P_{j,n} = StartP_j + (n - ChanNum/2 + Aper_j/2) * \Delta n_j + Offset_j$$

$$\text{if } (P_{j,n} > N/2 - 1)\ P_{j,n} = N - 1 - P_{j,n}$$

$$Offset_j = -Fx_j/d * \Delta n_j$$

$d$ is the interval between transducer elements

The formulas (2) and (2') may be unified into formula (3). For the formula (2), $Fx_j$ is always 0; for the formula (2'), the depth $F_{xj}$ is constantly 00', but in more extensive situation, $Fx_j$ varies with the depth.

The value of $Fx_j$ may be calculated in real-time by hardware, and the calculation formula is:

$$Fx_j = Fx_{j-1} + \Delta Fx = Fx_o + j * \Delta Fx \quad (4)$$

ΔFx is the interval in between abscissas of the reception focuses in case of two apodization curves changing (referring to FIG. 3). Since the time intervals of the variations of the apodization curves are fixed, thus ΔFx is also a fixed value.

In formula (3), a division is required in the calculation of $Offset_j$. However in common hardware calculation circuitry, a division is expected to be avoided whenever possible. Therefore, $Fx_i/d$ may be calculated with the following formula:

$$Fx_j/d = (Fx_o + j * \Delta Fx)/d = Fx_o/d + j * \Delta Fx/d \quad (5)$$

The values of $Fx_o/d$ and ΔFx/d can be calculated by software, and written into hardware registers before staring of scanning, and the hardware calculates $Fx_j/d$ by way of summation.

IV. Hardware Implementation

Figure 4:
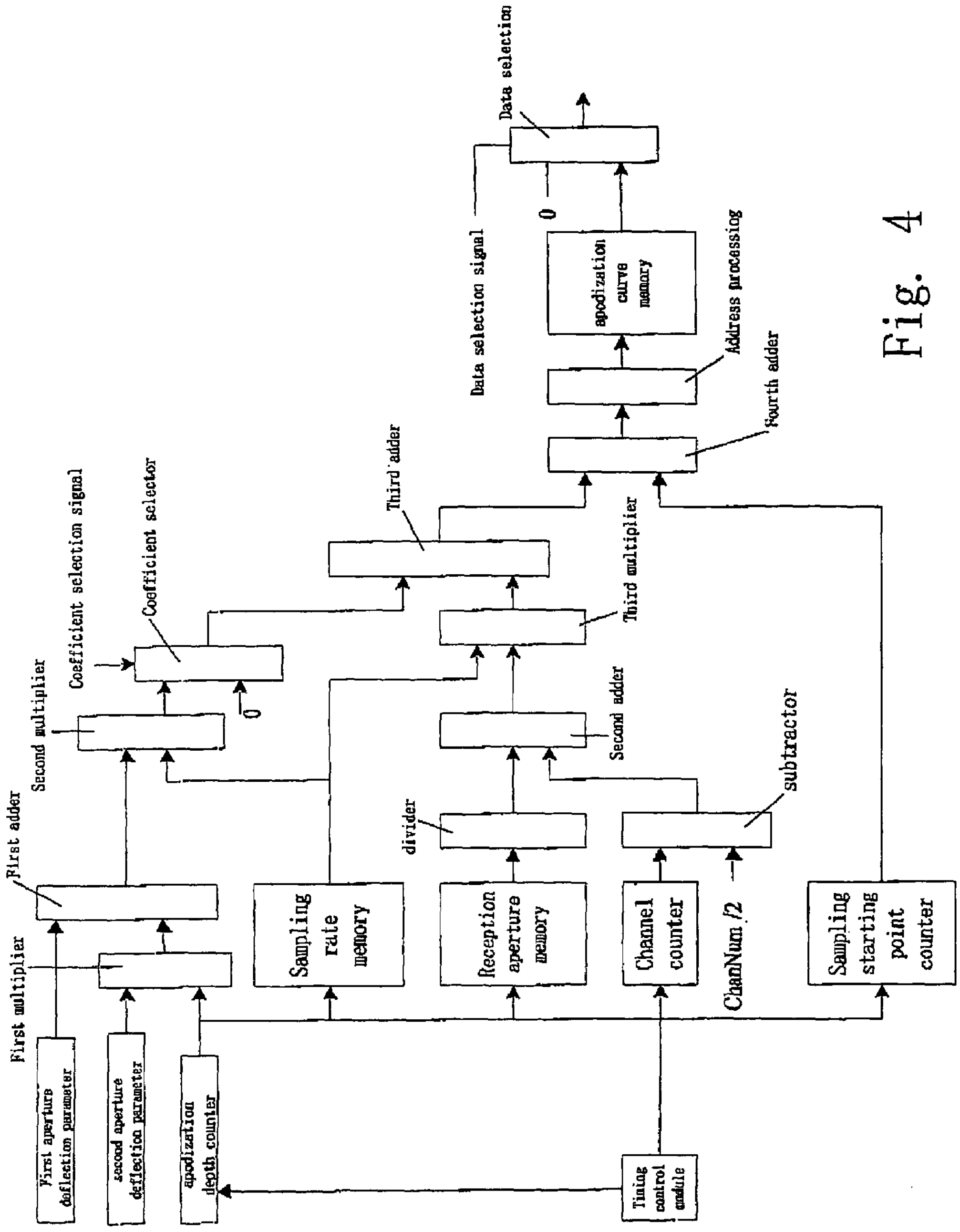
FIG. 4 is a block diagram showing a hardware structure of a real time calculation apparatus for calculating apodization parameters in accordance with one embodiment of the present invention.

Taking an ultrasonic imaging system of 64 channels and single beam as example, it is required to calculate the apodization parameters of at most 64 channels in beamforming. The implementation apparatus is show in FIG. 4.

The implementation apparatus comprises an apodization curve memory, a sampling starting point memory, a sampling rate memory and a reception aperture memory, inputs of a first deflection parameter and a second deflection parameter, and further comprises a depth counter, a channel counter and a timing control module. The first deflection parameter corresponds to the factor Fx0/d in the algorithm and the second deflection parameter corresponds to the factor ΔFx/d in the algorithm.

The sampling rate memory stores the values of the sampling rate of apodization curves at different apodization depths, an address of the memory corresponds to the apodization depth, and a value in the address corresponds to the sampling rate value at the depth. The reception aperture memory stores the sizes of the reception apertures at different apodization depths, an address of the memory corresponds to the apodization depth, a value in the address corresponds to the size of the reception aperture at the apodization depth. The sampling starting point memory stores values of starting points sampled on apodization curves in the reception apertures at different apodization depths, the address of the memory corresponds to the apodization depth, and the value in the address corresponds to the sampled starting point values. The apodization curve memory stores the left half of a left-right symmetrical and normalized curve, the address corresponds to the abscissas of the curve and the value in the address corresponds to the amplitude of the curve.

Under the control of the timing control module, the apodization depth counter is incremented by 1 in accordance with the variation time interval of the apodization curve, and at a certain depth of the apodization curve, it controls the channel counter to count from channel 0 up to channel 63 at a certain time interval.

The count values of the apodization depth counter are the read addresses of the sampling rate memory, the reception aperture memory and the sampling starting point memory. Based on the count values of the apodization depth counter, the sampling rate parameter $\Delta n_j$, the reception aperture parameter $Aper_j$ and the sampling starting point parameter $StartP_j$ at the apodization depth can be read from the sampling rate memory, the reception aperture memory and the sampling stating point memory, respectively.

The second aperture deflection parameter is multiplied by the count value of the apodization depth at the first multiplier, the product obtained is added to the first aperture deflection parameter at the first adder to obtain the factor $Fx_j/d$ at the apodization depth. Then this factor is multiplied by the sampling rate parameter $\Delta n_j$ at the second multiplier, the result of the multiplication is the offset in this mode.

If the channel corresponding to the count of the channel counter is within the reception aperture, then the coefficient selection signal selects the offset calculated by the second multiplier to be outputted; if the channel corresponding to the count of the channel counter is outside the reception aperture, then the coefficient selection signal selects to output 0. This selection control is implemented at the coefficient selector.

The reception aperture value at the depth is read out from the reception aperture memory and then is divided by 2. The division may be implemented by simply right-shifting one bit. The result of the division is added to the result of the count of the channel counter minus ChanNum/2 at the second adder, and the result of the addition is multiplied by the sampling rate $\Delta n_j$ at the third multiplier, the result of the multiplication is the factor (n-ChanNum/2+$Aper_j$)*$\Delta n_j$ in formula (3).

The offset, the sampling starting point parameter $StartP_j$ and the factor (n-ChanNum/2+$Aper_j$)*$\Delta n_j$ are added at the third adder and the fourth adder, to obtain the sampling coordinate of the channel n at the apodization depth j, which corresponds to the factor $P_{j,n}$ in the formula (3). The address process is performed on the sampling coordinate at the address processing module. If the sampling coordinate is greater than one half of the length of the apodization curve (i.e. N/2), then $N-1-P_{j,n}$ is taken as the address; if the sampling coordinate is less than or equal to one half of the length of the apodization curve, then $P_{j,n}$ is taken as the address. The address outputted from the address processing module is used as a read address of the apodization curve memory, the data read out is sent to a data selection module. If the channel is within the reception aperture, the data selection signal selects data of the memory to be outputted, the data read at this address is the apodization value of channel n at the apodization depth j; if the channel is outside the reception aperture, the data selection signal selects the data 0, and the apodization value of the channel at this apodization depth is zero.

The timing control module controls the channel counter to count from 0 up to 63 at the apodization depth j so that the apodization parameter calculation of 64 channels can be completed. When the timing control module controls the apodization depth to be counted from 0 to the maximum scanning depth during the beamforming, all apodization parameters of the system of 64 channels and single beam are calculated in real-time.

What is claimed is:

1. A beamforming method used in an ultrasonic imaging system comprising:

receiving reflected echo signals from reception rays by transducer elements;

transmitting, by transducer elements, the received reflected echo signals to a receiving and processing channel for amplification processing and AD conversion to obtain digital echo data;

storing said digital echo data in a memory;

generating, by an apodization parameter real time calculation device, apodization parameters based on said digital echo data; and forming a beam by invoking the generated apodization parameters.

2. The method according to claim 1, wherein said generating step comprising;

presetting an apodization curve reference curve of length N; and sampling said preset apodization curve reference curve according to depths, from different starting points and at different sampling rate, so as to obtain apodization curves at different depths.

3. The method according to claim 2, wherein said apodization curve reference curve is symmetrical, and N/2 points of the left half or the right half of said curve are stored.

4. The method according to claim 2, wherein said N is greater than 32 in order to guarantee calculation precision.

5. The method according to claim 3, wherein when the apodization parameters at different depths are sampled by use of said apodization curve reference curve, it is determined first whether corresponding transducer elements are within an aperture, apodization parameter outside the aperture is zero, and the transducer elements within the aperture start to sample from Start Pj, the sampling rate is $\Delta n_j$, where j represents different reception depths, and the apodization parameters $Rapo_{j,n}$ within the aperture are calculated by using following formulas:

$$Rapo_{j,n} = \begin{cases} \mathrm{Win}(P_{j,n}) & n \text{ within the aperture} \\ 0 & n \text{ outside the aperture} \end{cases}$$

where $$P_{j,n} = StartP_j + (n - ChanNum/2 + Aper_j/2) * \Delta n_j + Offset_j$$

$$\text{if } (P_{j,n} > N/2 - 1)\ P_{j,n} = N - 1 - P_{j,n}$$

$$Offset_j = -Fx_j / d * \Delta n_j$$

$d$ is a interval between transducer elements $$Fx_j = Fx_{j-1} + \Delta Fx = Fx_0 + j * \Delta Fx$$

Where, Win($p_{j,n}$) is a preset apodization parameter curve, $Aper_j$ is a size of the reception aperture, $Starp_j$ is a value of the starting point sampled at the apodization curve within the reception aperture at different apodization depths, ΔFx refers to the interval in between abscissas of two reception focuses in the case of the apodization curves changing, j is the depth, n is a serial number of a transducer element, and ChanNum is the number of receiving and processing channels, n ranges from 0 to ChanNum-1.

6. The method according to claim 5, wherein the calculation step comprises:

i. incrementing an apodization depth counter according to the time interval of variation of the varying trace, under the control of a timing control module;

ii. assigning, by said apodization depth counter, its count value to a sampling rate memory, a reception aperture memory and a sampling starting point memory, respectively, as their read addresses, reading a sampling rate parameter $\Delta n_j$ at the apodization depth from said sampling rate memory, reading a reception aperture parameter $Aper_j$ at the apodization depth from said reception aperture memory, and reading a sampling starting point parameter $StartP_j$ at the apodization depth from said sampling starting point memory, respectively;

iii. multiplying, by a first multiplier, the second aperture deflection parameter ΔFx/d by the value of the apodization depth count, adding the obtained result to the first aperture deflection parameter $Fx_o$/d by a first adder to obtain a factor $Fx_i$/d at the apodization depth, then multiplying the factor $Fx_i$/d by said sampling rate parameter $\Delta n_j$ by a second multiplier, wherein the result of the multiplication is the offset $Offset_j$;

iv. if the channel corresponding to the count of said channel counter is within the reception aperture $Aper_j$, selecting, by the coefficient selection signal, the second multiplier to calculate the output offset; if the channel corresponding to the count of said chapel counter is outside the reception aperture $Aper_j$, selecting, by the coefficient selection signal, the second multiplier to output zero, wherein this selection control is implemented at the coefficient selector;

v. reading the value of the reception aperture at the depth from the reception memory, dividing the read value by 2, adding the result of the division to the result of the count of the channel counter minus ChanNum/2 at the second adder, and multiplying the result of addition by the sampling rate $\Delta n_j$ at the third multiplier, wherein the result of the multiplication is the factor (n-ChanNum/2+$Aper_j$) A;

vi. summing the offset $offset_j$, the sampling starting point Start $p_j$ and the factor (n-ChanNum/2+$Aper_j$)*$\Delta n_j$ by the third adder and the fourth adder, so as to obtain the sampling coordinate of channel n at apodization depth j, wherein the sampling coordinate corresponds to the factor $P_{j,n}$, performing address process on the sampling coordinate by an address processing module, wherein if the sampling coordinate $P_{j,n}$ is greater than one half of the length of the apodization curve, i.e., N/2; the address takes the coordinate $N-1-P_{j,n}$; if the sampling coordinate is less than or equal to one half of the length of the apodization curve, the address takes $P_{j,n}$;

vii. using the address output by the address processing module as a read address of the apodization curve memory, and passing the read data through a data selection module, wherein if the channel is within the reception aperture, the data selection signal selects to output data in the memory, the data read from the address is the apodization parameter of channel n at the apodization depth j; if the channel is outside the reception aperture, the data selection signal selects data zero, then the varying parameter of the channel n at the varying depth j is zero;

viii. controlling, by the timing control module, the channel counter to count from channel 0 up to channel ChanNum-1 at the apodization depth j with the time interval of 1; and cyclically performing step i to step viii to obtain the apodization parameters of ChanNum channels.

7. The method according to claim 6, wherein, the number of said receiving and processing channels ChanNum ranges from 1 to 512.

8. A beamforming apparatus used in an ultrasonic imaging system, comprising:

a probe including a plurality of transducer elements, for receiving reflected echo signals from reception rays;

receiving and processing channels, for amplifying, processing and AD converting the received reflected echo signals to obtain digital echo data;

a memory, for storing said digital echo data;

an apodization parameterreal time calculation device, for generating apodization parameters based on said digital echo data; and a beamforming module, for forming a beam by invoking the generated apodization parameters.

9. A real time calculation apparatus for calculating apodization parameters, said apodization parameters are used for a beam in an ultrasonic imaging system, said calculation apparatus is connected to a signal input terminal of a receiving and beamforming module of the ultrasonic imaging system, said calculation apparatus comprises:

first to third multipliers, first to fourth adders, a subtractor, a divider, a sampling rate memory, a reception aperture memory, a sampling starting point memory, an apodization curve memory, an apodization depth counter, a channel counter, a coefficient selector, a data selection module, an address processing module, and a timing control module;

wherein, signal output terminals of said timing control module are connected to said channel counter and said apodization depth counter, respectively; said apodization depth counter sends its count value to the sampling rate memory, the reception aperture memory, and the sampling starting point memory; respectively; input terminals of said first multiplier are connected to an input of a second ape deflection parameter ΔFx/d and said varying depth counter, and the output thereof is sent to said first adder together with a first aperture deflection parameter Fx0/d;

input terminals of said second multiplier are connected to output terminals of the first adder and the sampling rate memory, respectively; the output terminal of said second multiplier is connected to the coefficient selector; an input terminal of said divider is connected to the reception aperture memory, an output terminal of said divider are connected to said second adder; said subtractor subtracts ChanNum/2 from the count value of said channel counter, and the output thereof is sent to said second adder; wherein the ChanNum is the number of channels;

input terminals of said third multiplier are connected to the output terminals of the second adder and the sampling rate memory, respectively; an output terminal of said third multiplier and an output terminal of the coefficient selector are connected to the third adder; an output of said third adder and an output of the sampling starting point memory are added by the fourth adder and thew sum is sent to said address processing module for address processing; an address outputted by the address processing module is used as a read address of said apodization curve memory, the data read therefrom is sent to said data selection module; and said data selection module outputs an apodization value of channel n at apodization depth j.

* * * * *